United States Patent Office 3,574,539
Patented Apr. 13, 1971

3,574,539
METHOD OF MANUFACTURING CRYSTALLINE MORDENITE
Daniel Domine, Meudon, and Jean Quobex, Paris, France, assignors to L'Air Liquide, Societe Anonyme, pour l'Etude et l'Exploitation des Procedes Georges Claude
Continuation of application Ser. No. 564,146, July 11, 1966, which is a continuation-in-part of application Ser. No. 468,480, June 30, 1965. This application Sept. 27, 1968, Ser. No. 768,610
Claims priority, application France, July 21, 1964, 982,465, Patent 1,411,753; July 12, 1965, 22,354, Patent 88,553, 22,355, Patent 88,554
Int. Cl. C01b 33/28
U.S. Cl. 23—112
8 Claims

ABSTRACT OF THE DISCLOSURE

A process is disclosed for synthesizing crystalline mordenite by a hydrothermal treatment. A water dispersion of a powdery amorphous alkali metal silicoaluminate having a similar analysis to that of mordenite is treated under pressure for at least several hours at a temperature of at least 100° C. and at an initial pH between 11 and 13.3.

---

Figure 1:
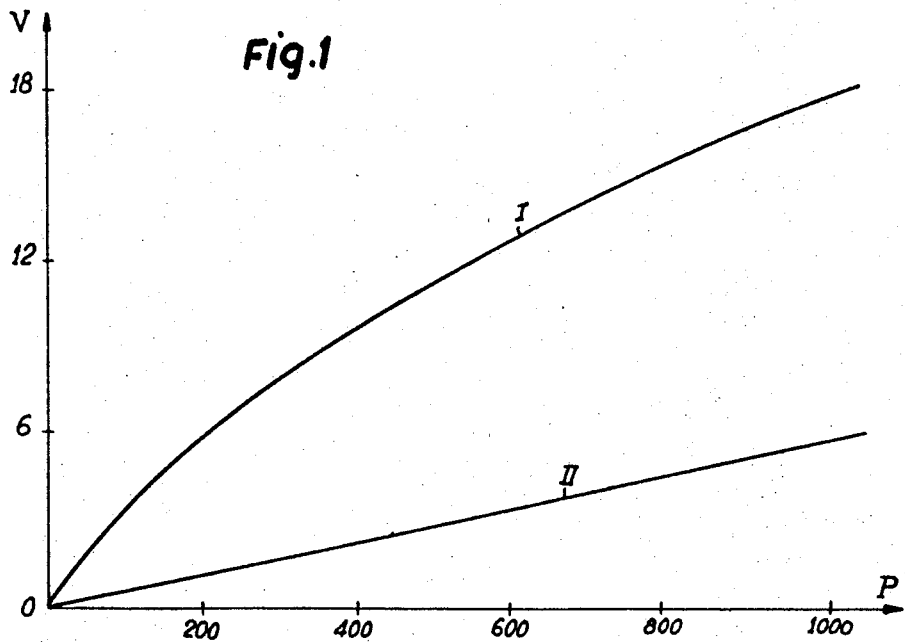

This application is a continuation of application Ser. No. 564,146, filed July 11, 1966, now abandoned without prejudice in favor of the present application, which in turn is a continuation-in-part of application Ser. No. 468,-480, filed June 30, 1965, which was abandoned without prejudice in favor of application Ser. No. 564,146.

This invention relates to the preparation of crystalline mordenite, suitable for use in the dessiccation of gases and in the separation of gas mixtures by preferential adsorption.

Mordenite is a crystalline silicoaluminate with a well-defined structure, which is classified among the zeolites. It is found in a small number of deposits in the natural state. It is one of the richest in silica of all zeolitic silicates. The formula of the natural product may be written as:

$$(Na_2, Ca\ K_2)O.Al_2O_3.10SiO_2.6-7H_2O$$

Mordenite, like all zeolites, loses its water of hydration when heated to 300°–400° C., the crystalline lattice remaining unchanged. The anhydrous product shows high affinity for water, and is highly efficient for gas drying; the hydration-dehydration cycle can be repeated indefinitely without altering the structure.

The work of R. M. Barrer, published in Transactions of the Faraday Society 1944, vol. 40, page 555, has shown that mordenite has a sturdy tridimensional crystalline lattice capable of adsorbing gases and showing the properties of the molecular sieve.

W. Meier (Zeitschrift für Kristallographie 1961, vol. 115, pages 439–450) ascertained the structure of natural mordenite.

The molecular sieve properties of mordenite, according to this author, are to be attributed to a system of parallel channels 6.6 A. in diameter, interconnected at right angles by smaller channels, 2.8 A in diameter. Defects in the stacking of the structure reduce the effective diameter of the interacrystalline channels to about 4 A.

Mordenite, like most other zeolites has a high affinity for gas molecules with a certain polarity, such as $H_2S$ and $NH_3$. Generally speaking, it adsorbs the gas molecules small enough to penetrate the channels of its porous structure, notably carbon dioxide, oxygen, methane and ethane. It rejects larger molecules.

An especially significant application of mordenite is the separation of oxygen-nitrogen mixtures at room temperature, according to the method described in U.S. Patent No. 3,155,468 of Nov. 3, 1964, granted to the applicant. According to the same method, mordenite may be used for the separation of the hydrogen-nitrogen mixture from ammonia cracking for the production of pure hydrogen, and for the separation of helium-nitrogen and helium-methane mixtures for the production of pure helium from natural gas.

Through hydrothermal treatment of aqueous aluminosilicate gels, Barrer (Journal of the Chemical Society 1948, vol. 2, page 2158) obtained sodium mordenite in the formula range $Na_2O.Al_2O_3.8.1SiO_2.nH_2O$ to

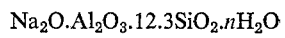

$$Na_2O.Al_2O_3.12.3SiO_2.nH_2O$$

the starting materials being defined as a sodium aluminate known under the trade name "Alfloc," containing 92% $Al_2ONa$, and a silicic acid dispersion containing a trace of alkali. According to the procedure described by the author, the opalescent solution of sodium aluminate is poured into the silicic acid dispersion; the mixture becomes opaque and shows a tendency to gelling. The aquous gel is treated in an autoclave under pressure. Mordenite was present in the products, but was accompanied by other species, both crystalline and non-crystalline. The conditions recommended were a temperature between 265° C. and 295° C. and a $SiO_2/Al_2O_3$ ratio in the neighborhood of 10, the time of treatment on the autoclave being 1 to 2 days.

It was shown in U.S. patent application No. 361,246 of Apr. 20, 1964 now abandoned, in the name of first the applicant, that mordenite could be obtained from any colloidal silica.

If the method defined by Barrer is used with silica sols of various origins, most of the latter give no mordenite, even when strictly following the procedure developed by the author.

The method disclosed in the above-mentioned patent application which allows reproductible preparation of mordenite, consists in the use of a silica sol obtained by deionizing an alkaline metal silicate through ion exchange on a cation exchanger under the acide form. The silica sol may be subjected to mild concentration, while preserving its stability towards gelling, up to about 30% silica by weight, before it is brought into contact with the sodium aluminate solution. The favorable temperature range is 250°–350° C., and the initial $SiO_2/Al_2O_3$ ratio lies between 12 and 13. The reaction time is less than an hour, and the hydrothermal treatment may be continued up to hours without any disadvantage.

Thus, the only known methods use as the chief raw material a colloidal silica sol, concentrated or unconcentrated, obtained under well-defined operating conditions.

According to this invention, a simple and reproducible commercial method has been found for the production of crystalline mordenite, which makes use of a raw material less costly than stabilized silica sol, and is easier to carry out. The method comprises the treatment under pressure, for several hours at least, at temperatures between 100° C. and 370° C., preferably between either 250° C. and 350° C., or between 100° C. and 200° C., of a water dispersion of an amorphous alkaline metal aluminosilicate with a molar analysis such that the $SiO_2/Al_2O_3$ ratio lies between 9 and 13, preferably between 10 and 12, and that the $M_2O/Al_2O_3$ ratio lies between 0.5 and 1.6 (M being the alkaline metal), in the presence of such an amount of alkali that the initial pH lies between 11 and 13.

Through hydrothermal treatment under pressure, the amorphous silicoaluminate of the invention, with a similar analysis to that of mordenite, undergoes a conversion to a product with a crystalline appearance, mainly formed of mordenite, with a small amount of other species, notably of analcime and quartz.

According to another aspect of the invention, agglomerated crystalline mordenite may be obtained directly in the particulate condition by merely physically agglomerating the amorphous alkaline silico aluminate into particles before conversion of same to the crystalline mordenite.

The amorphous silicoaluminate suitable for carrying out the invention may be prepared according to either of the two following methods.

According to the first method, the amorphous silicoaluminate is prepared by precipitation between a solution of alkaline metal silicate and a solution of an inorganic aluminum salt.

The reaction between the solutions of alkaline metal silicate and of aluminum salt leads to the formation of an insoluble amorphous alumino-silico-alkaline compound, which is precipitated, while the aluminum salt is quantitatively converted to the corresponding alkali salt.

The literature contains descriptions of the preparation of similar compounds. The identification of such materials is difficult, as it can be effected through chemical analysis only. Mellor quotes a number of preparations of aluminosilicates ("A Comprehensive Treatise on Inorganic and Theoretical Chemistry," vol. VI, p. 567). Von Ammon ("Über einige Silikate der Alkalien und Erden," Köln, 37, 1862) added a solution of soluble glass (sodium silicate) to a solution of aluminium sulphate.

This invention includes the conditions for the preparation of an alkaline-metal silicoaluminate capable of conversion through hydrothermal treatment to a crystalline zeolite identified with mordenite.

The analysis of the amorphous precipitate of silicoaluminate depends on the ratio $SiO_2/Al_2O_3=R$, the overall ratio in the starting mixture, and on the ratio $SiO_2/M_2O$ in the silicate used, M being an alkaline metal, but also on the nature of the silicate. The amorphous silicoaluminate used in the method of the invention cannot be obtained from every silicate.

The alkaline-metal silicate used is preferably a sodium silicate with a high silica content, the $SiO_2/Na_2O$ ratio being in the range 2–3.5, so that the $SiO_2/Al_2O_3$ ratio in the precipitate is at least equal to 10.

The aluminium salt is preferably an inorganic salt such as the sulphate, chloride or nitrate, or an alum.

The solutions of aluminium salt and of alkaline metal silicate are mixed at room temperature, and the resulting material, a watery slurry of the silicoaluminate formed, is well stirred while mixing.

The reaction may be effected by adding one solution to the other or by adding both at once in the reaction vessel. In the latter case, the correct ratio between the reagents is maintained. But this is not critical, and satisfactory results may be obtained by the first method.

According to the second embodiment of the method for the production of crystalline mordenite according to the invention, the amorphous silicoaluminate to be subjected to hydrothermal treatment is prepared according to the method disclosed in French Pat. No. 1,108,122 of Apr. 23, 1964, granted to the J. M. Huber Corporation, with a $SiO_2/Al_2O_3$ ratio at least equal to 10.

Through hydrothermal treatment under pressure, under the conditions laid down by the invention, this amorphous silicoaluminate, with a similar analysis to that of mordenite, undergoes a conversion to a product with a crystalline appearance, containing chiefly mordenite with other species, notably analcime and quartz.

Numerous trials effected on amorphous silicoaluminate, with similar analyses to that of mordenite, have made it possible to find, to specify and to define the ranges of temperature and pH, as well as the duration of the hydrothermal treatment, suitable for the synthesis of crystalline mordenite.

The materials used have such an analysis that the $SiO_2/Al_2O_3$ ratio lies between 9 and 13 and the $Na_2O/Al_2O_3$ ratio between 0.5 and 1.6 approximately.

The alkaline metal silicoaluminate is dispersed in water in the presence of a small amount of alkali, so that the initial pH lies between 11 and 13. The watery slurry is placed in an autoclave and heated to a temperature about 100° C., under the corresponding water vapor pressure.

The rate of formation of mordenite is increased when the pH is raised, the upper limit being 13.3; in practice, however, the pH should not exceed 13 if pure mordenite is to be obtained. The time of reaction is a few hours; the higher the temperature, the shorter the time, however, the temperature should remain below the critical temperature of water, 375° C., as the reaction occurs only in the presence of a liquid water phase.

After hydrothermal treatment under pressure, the synthetic products are checked. Among the criteria of quality and purity, the X-ray diffraction diagram and gas adsorption properties have been selected.

The degree of adsorption reflects the purity of the product. The adsorption of nitrogen e.g. at 20° C. under 1013 millibars has a well-defined value for pure mordenite, as the other species which accompany mordenite, such as analcime and quartz, do not adsorb nitrogen. The amount of oxygen adsorbed increases with the amount of nitrogen adsorbed.

The conclusions drawn from the adsorption of nitrogen, oxygen and argon are valid only if the crystalline species mordenite is present. The powder X-ray diagram is therefore taken for each sample, and the distances between reticular planes which make it possible to identify the various crystalline species present, are computed by the usual techniques.

The formula of mordenite may be written as

$$Al_2O_3 \cdot 10SiO_2 \cdot Na_2O;$$

however, variations of composition are possible within certain limits without any alteration of the characteristic X-ray diagram. For some products, according to the method of preparation, the $SiO_2/Al_2O_3$ ratio may vary between 8.5 and 10.8 and the $Na_2O/Al_2O_3$ ratio between 0.8 and 1.4.

Generally speaking, the adsorbing properties are the better as the composition is nearer the typical analysis of mordenite.

From the synthetic sodium mordenites prepared according to the invention, other synhtetic mordenites may be prepared through ion exchange with alkaline ions such as lithium, or with alkaline earth ions such as calcium, barium or magnesium, or with hydrogen ions. The exchange can be carried out by circulating over the sodium mordenite contained in a column, a solution of the exchanger metal salt or of hydrochloric acid until there is no longer any appreciable variation in the sodium ion.

Through dehydration of the above synthetic mordenites, dehydrated synthetic mordenites are readily obtained, which are suitable notably for the dessication and decarbonisation of gases and for the separation of gas mixtures by preferential adsorption and especially for obtaining super-oxygenated air from an oxygen-nitrogen mixture, or for hydrogen-nitrogen or helium-nitrogen separation.

In certain cases it is desirable to obtain the mordenite in agglomerated particulate form. This is accomplished by agglomerating the amorphous alkaline silico aluminate prior to the treatment thereof to form the mordenite.

This agglomeration of the amorphous alkaline silico aluminate can be carried out by several methods, e.g. by extrusion, by compression or pastille-forming, granulation or pelletising, leading to physical forms such as wires, rodlets, lozenges, granulates, beads, globules, or balls. In the case of physical shaping in the particulate condition, by pressing or forming, this operation is carried out by treating the very fine amorphous alkaline silico aluminate powder in compression machines. When the amorphous alkaline silico aluminate is agglomerated in the particulate condition in the form of small balls, the powder is slightly moistened, and the forming is done by mechanical action. When the agglomeration is achieved to give rodlets or granules, the starting material is a very thick plastic paste, prepared by adding water to the amorphous alkaline silico aluminate, and this material is then extruded to form wires which are then cut up to give the desired physical form. The diameters of the wires are in no way critical; they can, for example, have a diameter of from 1 to 3 or 4 mm. The same applies in the case of the dimensions of the granules, lozenges, spheres, or other particles.

So as to make it easier to obtain the particle form, the paste may be prepared in the presence of a very small quantity of plasticiser, a few percent at most, which proportion is not enough to bring about cohesion of the silico aluminate, and is intended only to facilitate the forming of particles, particularly for making extrusion easier. The plasticiser is a member of the group comprising the carboxy-alkyl celluloses, the alkyl celluloses, the hydroxy-alkyl celluloses, polyvinyl alcohol, the plastic clays, bentonite, kaolin and colloidal silicon, introduced in proportions in the order of 1 to 10%, and sodium silicate in a diluted solution.

The agglomerated particles obtained from a very thick paste by extrusion, or from a dry paste by pressing, are then dried in air and stoved at a temperature of preferably at least 100° C. In the case of the extruded products, the wires are broken up into rodlets or granulates. The stoving treatment can, with advantage, be intensified by raising the particles of agglomerated amorphous silico aluminate to a relatively high temperature over at least an hour. This heat-treatment of the particles can be carried out, for example, in a furnace up to about 800° C., and preferably between 550 and 650° C. On heating, a certain fritting of the solids occurs, and the particles, in the form of which the amorphous silico aluminate occurs, have a better cohesion, After this heat-treatment the particles in the form of rodlets, granulates, beads, golbules, lozenges, etc., are placed in water and subjected to a hydrothermal treatment as indicated above to obtain the crystalline mordenite.

Very hard particles are obtained by this procedure, these being comprised of substantially pure mordenite, as is shown by X-ray diagrams and adsorption measurements. This mehtod has the advantage of resulting in the production of particles of agglomerated mordenite of a hardness greater than that which is obtained by the conventional method of agglomerating pluverulent mordenite with an inert binding agent followed by extrusion and baking. Furthermore, the mordenite particles prepared in accordance with the present method comprise practically pure mordenite, and have a greater adsorption capacity than the particles made by the addition of an inert binding agent.

Exchanged mordenites can be prepared by the partial or complete exchange of the sodium ions of synthetic sodium mordenites, obtained direct in the form of particles by partial or complete exchange of the sodium ions for the alkaline-earth ions or the hydrogen ion. The provision of these particles of pure zeolite avoids the troubles caused by the presence of the binding agent, of a clayey type, contained in the grains of agglomerated zeolite, which troubles are encountered particularly in catalytic applications.

The following examples of the preparation of crystalline mordenite are given as illustrations, and are not intended to restrict the scope of the invention in any way.

EXAMPLE I

The formation of amorphous silicoaluminate, the raw material for the synthesis of mordenite, was obtained from mixtures so compounded that the total ratio $R = SiO_2/Al_2O_3$ of the starting mixture was at least equal to 10.

The starting materials used in those trials were aluminium sulphate with 17.45% $Al_2O_3$ and 38% $SO_3$, the formula of which may be written as $$2.77 SO_3 \cdot Al_2O_3 \cdot 14.4 H_2O$$

and technical sodium silicate (40°–42° Baumé, $d=1.39$ g./cc. at 20° C.). The sodium silicate contained 27.6% $SiO_2$ by weight and 9% $Na_2O$ by weight. The $SiO_2/Na_2O$ ratio was 3.2.

The aluminium sulphate and sodium silicate solutions were mixed at room temperature, and the watery slurry of silicoaluminate obtained was vigorously stirred while mixing. The precipitate formed was separated from the solution by filtering or centrifuging, and washed. Complete elimination of sodium sulphate by washing is unnecessary, and some trials with unwashed samples gave mordenite by hydrothermal treatment. For operating convenience, the precipitate was usually washed and dried. The powdery product obtained was dispersed in water, and the pH was adjusted to a value between 12 and 12.5 through addition of a small amount of caustic soda;

Table II hereafter summarizes the results of trial preparations from commercial 40°–42° Baumé sodium silicate, $SiO_2/Na_2O=3.2$. The procedure for the preparation of amorphous silicoaluminate is denoted by A when the silicate solution was slowly poured into the aluminium sulphate solution, by B when both solutions were introduced at once, which made it possible to maintain the correct ratio between the two reagents. In the latter case, the vessel into which both reagents were introduced usually contained a certain amount of water, which facilitated the dispersion of the precipitate formed. However, some trials were made without addition of diluting water. The initial molecular ratio $R = SiO_2/Al_2O_3$, i.e. the ratio between the solutions, was varied between 10 and 17.5.

The hydrothermal treatment of the amorphous precipitate was effected in small stainless steel autoclaves. The autoclaves were placed on an aluminium block with seven recesses so shaped as to be exactly fitted to the autocalves. A thick aluminium cover ensured uniform temperatures. Heating was effected by a resistor wound round the cylindrical aluminium block. Thermocouples were placed in holes drilled in the block for temperature control. The assembly was well insulated.

When an autoclave with its batch of material was placed in the aluminium block, previously brought to constant temperature, it reached its equilibrium temperature after 20 minutes; the times were counted from that moment.

After a given time, the autoclave was removed from the block and quickly cooled under running cold water: therefore, practically no extra time had to be added to the time at constant temperature.

The conditions of the hydrothermal treatment were the same in all trials. The duration was 15 hours at 300° C., corresponding to 87 bars pressure.

At the outset of the trial, the amorphous precipitate was dispersed in distilled water, and the pH of the dispersion was measured. The pH was adjusted to definite values by addition of small amounts of pure sodium hydroxide.

The ratio $R_1 = SiO_2/Al_2O_3$ defines the composition of the amorphous silicoaluminate subjected to hydrothermal treatment, while $R_2$ denotes the $SiO_2/Al_2O_3$ ratio in the final product, the synthetic crystalline mordenite.

The result of the X-ray investigation is given for each trial: the letter M alone denotes essentially pure mordenite, while An denotes the presence of analcime.

The powder diagram was obtained with the K radiation of copper. The interplanar distances are given in Table I hereafter, as well as the relative intensities $I/I_0$ based on the most intense line (column IV of the tatble).

Columns I and II show the interplanar distances found for a natural mordenite and a synthetic mordenite by R. M. Barrer (Journal of the Chemical Society 1948, vol. 2, p. 2158). The relative intensities were estimated visually: v.s.=very strong, s.=strong, m.s.=medium strong, m.w.=medium weak.

Column III shows the data for mordenite (ptilotite) in ASTM index card No. 6-0239 established in 1954 by the American Society for Testing Materials. Relative intensities were estimated visually: the numbers shown are estimations, not measurements.

Column IV shows the properties of the essentially pure mordenite prepared according to the invention and denoted by the letter M.

TABLE I

| I, natural mordenite d, angstrom | II, synthetic sodium mordenite d, angstrom | III, mordenite ASTM index card ptilolite d, angstrom | | IV d, angstrom | I/Io |
|---|---|---|---|---|---|
| 13.5, s | 13.4, ms | 13.7 | 50 | {13.53, 10.24} | 40 |
| 8.66, s | 8.85, ms | 9.10 | 90 | 9.06 | 50 |
| 6.54, s | 6.49, ms | {6.61, 6.38, 6.10} | {90, 40, 50} | {6.57, 6.39, 6.08} | 55 |
| 5.72, m | 5.66, mw | {5.79, 5.03, 4.87} | {50, 10, 20} | {5.80, 5.05, 4.83} | 15 |
| 4.50, s | 4.50, ms | {4.53, 4.14} | {80, 30} | {4.52, 4.15} | 25 |
| 3.99, s | 3.98, vs | {4.00, 3.84, 3.76, 3.62, 3.56} | {90, 60, 20, 10} | {4.00, 3.84, 3.76, 3.53} | 60 |
| 3.40, s | 3.42, vs | {3.48, 3.39, 3.31, 3.22} | {100, 90, 10, 100} | {3.47, 3.39, 3.29, 3.22} | 100 |
| 3.15, s | 3.15, s | | | 3.16 | |

The table shows good agreement between the positions and intensities of the lines for the products of the invention and for the natural or synthetic products quoted (cols. I, II and III), and confirms the identification of the synthetic products of col. IV. The small discrepancies between the values of the interplanar distances have no bearing upon the crystalline structure or the identity of mordenite, and are due to the different origins of the samples, notably to small variations of the chemical analysis.

For control purposes, the seven main lines are usually investigated: their succession is perfectly characteritic of mordenite.

The amounts of nitrogen and oxygen adsorbed are also shown. The adsorption values are the results of trials effected at 20° C. under 1,013 millibars, expressed as cc.'s under normal conditions of temperature and pressure (NTP) per gram anhydrous product.

The results of X-ray investigation and of nitrogen and oxygen adsorption show good correlation.

The only impurities met in the course of those trials were analcime, amorphous silicates and quartz, in very small amounts. The quantities adsorbed were therefore directly related to the amounts of mordenite present. When the mordenite was essentially pure, the quantity of nitrogen adsorbed was 17-18 cc. (NTP) per gram anhydrous pure mordenite.

FIG. 1 of the appended drawing where P (abscissa) is the pressure in millibars and V (ordinate) the volume of adsorbed in NTP cc./g., shows the 20° C. adsorption isotherm of nitrogen (curve I) and oxygen (curve II).

Figure 2:
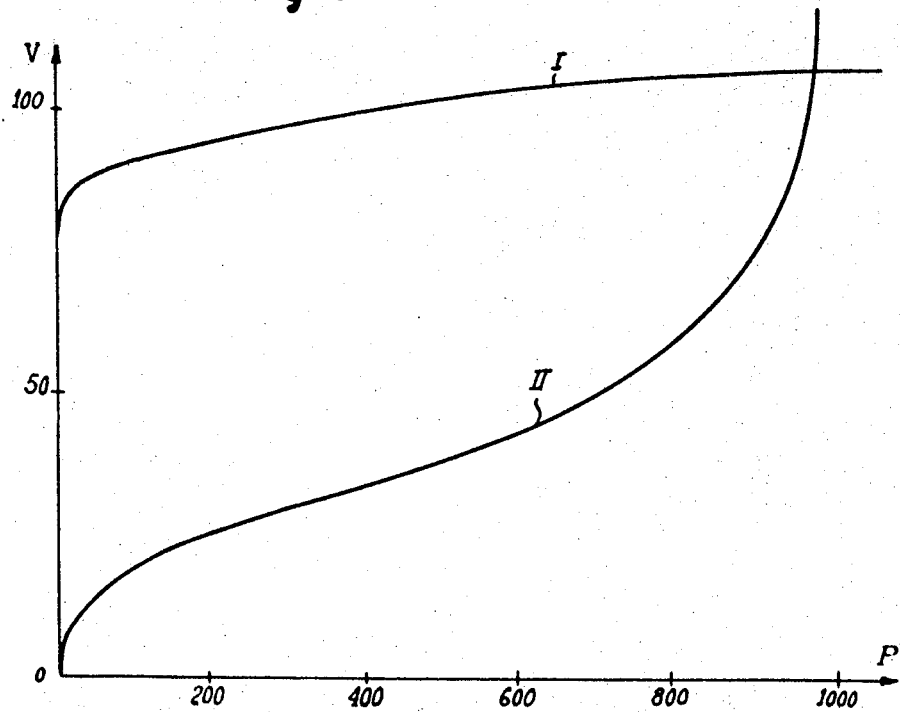

The adsorption of other gases, such as oxygen, at other temperatures is equally well defined. FIG. 2 of the appended drawing, where P and V have the same meanings as above, shows the −183° C. adsorption isotherm of oxygen (curve I) for pure crystalline mordenite.

TABLE II

| | Precipitation of amorphous silicoaluminate | | | | | | |
|---|---|---|---|---|---|---|---|
| Ration in initial mixture | 1 | 2 | 3 | 4 | 5 | 6 | 7 |
| R=SiO₂/Al₂O₃ | 10 | 10 | 10 | 10 | 12 | 16.5 | 17.5 |
| Sodium silicate: | | | | | | | |
| Quantity, grams | 218 | 109 | 43.6 | 109 | 653 | 150 | 460 |
| Water, cc | 163 | 170 | 270 | 170 | 2,300 | 0 | 0 |
| Moles SiO₂/litre | 3 | 2 | 0.66 | 2 | 1 | 6.4 | 6.4 |
| Aluminum sulphate: | | | | | | | |
| Quantity, grams | 56.4 | 28.2 | 11.35 | 28.2 | 175 | 23.6 | 70 |
| Water, cc | 100 | 100 | 100 | 100 | 3,000 | 120 | 200 |
| Moles Al₂O₃/litre | 1 | 0.5 | 0.2 | 0.5 | 0.1 | 0.35 | 0.62 |
| Operating procedure | B | B | A | A | B | A | B |
| Dilution water, litres | 1 | 0.4 | 0 | 0 | 0 | 0 | 1 |
| Analysis of the, R₁=SiO₂/Al₂O₃ | 9.9 | 10 | 9.2 | 9 | 10.4 | 12 | 13.5 |
| Precipitate, Na₂O/Al₂O₃ | | 0.7 | | 0.53 | 0.52 | 1.4 | |

| | Hydrothermal treatment of the amorphous precipitate | | | | | | |
|---|---|---|---|---|---|---|---|
| Initial mixture: | | | | | | | |
| Weight of precipitate, grams | 5 | 20 | 10.9 | 10 | 10 | 10 | 10 |
| Water, cc | 25 | 100 | 40 | 50 | 50 | 50 | 50 |
| pH of dispersion | 4.5 | 7 | | 7 | 8.9 | 11 | 10 |
| NaOH added | 1.3 | 0.9 | 0.7 | 0.7 | 0.6 | 0.3 | 0.4 |
| pH after addition | 12.3 | 12 | 12 | 11.9 | 12.2 | 12.2 | 12.2 |
| Analysis of final product: | | | | | | | |
| R₂=SiO₂/Al₂O₃ | 8.37 | 8.2 | 8.5 | 9.1 | 10.1 | 11 | 12.7 |
| Na₂O/Al₂O₃ | 0.73 | 0.75 | 0.72 | 0.50 | 0.74 | 0.77 | 0.85 |
| Adsorption at 20° C. under bar NTP cc.: | | | | | | | |
| Nitrogen | 15.6 | 17.4 | 8.4 | 3.9 | 15 | 18.4 | 16.5 |
| Oxygen | 5.6 | 5.4 | 3.0 | 1.1 | 5.2 | 6.4 | 5.9 |
| X-rays | M | ¹M | (²) | ³A | ¹M | M | M |

¹ Plus a little An.
² Blurred lines of M.
³ Little M plus amorphous.

The above table shows that with R=10, the best results were obtained when the precipitate was formed according to the "simultaneous mixing" procedure (cols. 1 and 2). The value of $R_1=SiO_2/Al_2O_3$ was then close to the value of R for the initial mixture. When the sodium silicate was poured into the aluminium sulphate, a loss of silica was observed: $R_1=SiO_2/Al_2O_3$ in the precipitate was below 10 (cols. 3 and 4), and the hydrothermal treatment gave a product containing incompletely crystallized mordenite. In fact, the analysis of the amorphous precipitate is no absolute criterion of a good synthesis of crystalline mordenite precipitates with $R_1=SiO_2Al_2O_3$ in the neighborhood of 10 can contain variable amounts of uncombined coagulated silica, hence a deficiency in actually combined silica in the silicoaluminate precipitate and poor mordenite after hydrothermal treatment.

When $R=SiO_2/Al_2O_3$ in the initial mixture was above 10, a precipitated silicoaluminate with the proper analysis was regularly obtained, whatever the procedure.

$$R_1=SiO_2/Al_2O_3$$

in the precipitate was 10 or more, and hydrothermal treatment gave good quality mordenite (cols. 5, 6 or 7).

A remarkable fact is that with a large excess of silica (R=16.5–17.5), $R_1$ did not exceed 12 in the precipitate. The silicoaluminous precipitate from 40°–42° Baumé silicate may be considered as a non-stoichiometric compound, the analysis of which can vary within certain well-defined limits in the trials of the invention. The formula may be written as $Al_2O_3 \cdot 9{-}13SiO_2 \cdot 0.5{-}1 \cdot 6Na_2O$.

EXAMPLE II

The starting materials used in this series of trials were commercial 40–42° Baumé sodium silicate $$(27.6\% \; SiO_2, \; SiO_2/Na_2O=3.2)$$

and aluminum sulphate (17.5% $Al_2O_3$). The amorphous silicoaluminates were obtained through simultaneous mixing of the reacting solutions.

The conditions of the hydroethermal treatment were identical for all trials: time 4 hours, temperature 340° C., corresponding pressure 150 bars.

The results of these trials are shown on Table III hereafter.

TABLE III

| | Precipitation of amorphous silicoaluminate | | |
|---|---|---|---|
| Ratio in initial mixture | 1 | 2 | 3 |
| R=$SiO_2/Al_2O_3$ | 12 | 11.8 | 11.9 |
| Sodium silicate: | | | |
|   Quantity, grams | 653 | 654 | 654 |
|   Water, cc | 2,530 | 2,530 | 2,530 |
|   Moles $SiO_2$/litre | 1 | 1 | 1 |
| Aluminium salt: | | | |
|   Nature | Sulphate | (¹) | (²) |
|   Quantity, grams | 175 | 505 | 252 |
|   Water, cc | 3,000 | 2,600 | 2,000 |
|   Moles $Al_2O_3$/litre | 0.1 | 0.18 | 0.184 |
| Operating procedure | B | B | B |
| Eau de dilution | 0 | 0 | 0 |
| Analysis of precipitate: | | | |
|   $R^1=SiO_2/Al_2O_3$ | 10.4 | 11.8 | 11.8 |
|   $NaO/Al_2O_3$ | 0.52 | 0.57 | 0.41 |

| | Hydrothermal treatment of amorphous precipitate | | |
|---|---|---|---|
| Initial mixture: | | | |
|   Weight of precipitate, grams | 20 | 20 | 20 |
|   Water, cc | 100 | 100 | 100 |
|   pH of dispersion | 8.6 | 8.4 | 9.6 |
|   pH after addition of NaOH | 11.9 | 12 | 11.9 |
| Final product, X-rays | ³M | ⁴M | ⁵M |

¹ Disolved chloride d=1.26 cc./grams.
² Pure nitrate.
³ Plus traces An.
⁴ Plus An.
⁵ Plus a little An.

The above table shows that aluminium chloride and aluminium nitrate may be used to advantage in the preparation of crystalline mordenite according to the invention.

EXAMPLE III

An amorphous silicoaluminate was prepared by reacting a solution containing 51°–52° Baumé sodium silicate, with $SiO_2/Na_2O=2.45$, upon a solution of aluminium sulphate containing 0.18 mole $Al_2O_3$ per litre.

The $SiO_2/Al_2O_3$ ratio in the initial mixture was R=12.

The silicoaluminate was precipitated by simultaneous mixing of a solution of 560 g. sodium silicate in 2,700 cc. distilled water and of a solution of 312 g. aluminium sulphate in 3,000 cc. distilled water, with good stirring, at room temperature, without diluting with water.

40 g. of the amorphous silicoaluminate thus prepared were dispersed in 200 cc. distilled water. The pH of the dispersion was 10.8: it was adjusted to 12.3 through addition of NaOH.

Fifteen hours of hydrothermal treatment under 65 bars, corresponding to a temperature of 280° C., led to the synthesis of a crystalline compound. X-ray investigation of the synthesized product demonstrated very sharp lines of crystalline mordenite, according to Table I, as well as the presence of a little analcime.

EXAMPLE IV

The starting materials used in these trials were powdered crystalline sodium metasilicate with $5H_2O$, water-soluble, containing 26.1% $SiO_2$ and 27.9% $Na_2O$, corresponding to the formula $0.97SiO_2.Na_2O.5.7H_2O$, and aluminium sulphate containing 17.45% $Al_2O_3$ and 38% $SO_3$.

The conditions of hydrothermal treatment were the same in all trials: time 15 hours, temperature 300° C., pressure 87 bars.

The results of the trials are summarized in Table IV hereafter.

TABLE IV

| | Precipitation of amorphous silicoaluminate | | | |
|---|---|---|---|---|
| Ratio in initial mixture | 1 | 2 | 3 | 4 |
| R=$SiO_2/Al_2O_3$ | 9.2 | 9.2 | 12 | 16.5 |
| Sodium silicate: | | | | |
|   Quantity, grams | 106 | 530 | 138 | 190 |
|   Water, cc | 250 | 250 | 300 | 250 |
|   Moles $SiO_2$/litre | 2 | 10 | 2 | 3.3 |
| Aluminium sulphate: | | | | |
|   Quantity, grams | 28.4 | 142 | 29 | 28.2 |
|   Water, cc | 100 | 100 | 100 | 100 |
|   Moles $Al_2O_3$/litre | 0.5 | 2.5 | 0.5 | 0.5 |
| Operating procedure | B | A | B | B |
| Dilution water, litre | 0.4 | 0 | 0.4 | 0.4 |
| Analysis of amorphous precipitate: | | | | |
|   $R_1=SiO_2/Al_2O_3$ | 3.5 | 3.4 | 3.6 | 3.3 |
|   $Na_2O/Al_2O_3$ | 0.88 | 0.8 | 0.5 | 0.75 |

| | Hydrothermal treatment of amorphous precipitate | | | |
|---|---|---|---|---|
| Initial mixture: | | | | |
|   Weight of precipitate, grams | 10 | 10 | 10 | 10 |
|   Water, cc | 50 | 50 | 50 | 50 |
|   pH of dispersion | 11.2 | 9.5 | 9.6 | |
|   NaOH added, grams | 0.3 | 0.5 | 0.5 | 0.5 |
|   pH after addition of NaOH | 12.4 | 12.5 | 12.4 | 12.4 |
| Adsorption at 20° C. under 1 bar, NTP cc.: | | | | |
|   Nitrogen | Negligible | | | |
|   Oxygen | | | | |
| X-rays | An | An | An | An |

The above table shows that mordenite cannot be obtained from sodium metasilicate with $SiO_2/Na_2O$ in the neighborhood of 1.

It should be observed that R=$SiO_2/Al_2O_3$ for the initial mixture varied from 9.2 to 16.5, whereas in the amorphous precipitate obtained, $R_1=SiO_2/Al_2O_3$ remained between 3.3 and 3.5 whatever the procedure. Such low silica contents cannot give mordenite by the usual hydrothermal treatment (15 hrs. at 300° C. under 87 bars), but give well-crystallized analcime of high purity.

An excellent method for the manufacture of analcime therefore consists in starting from the amorphous sodium silicoaluminate obtained through reacting sodium metasilicate and an aluminium salt, under such conditions that the $SiO_2/Al_2O_3$ ratio of the said amorphous silicoaluminate lies between 3.5 and 4.

EXAMPLE V

The silicoaluminate subjected to hydrothermal treatment under pressure for mordenite production was the silicoaluminate described in French Pat. No. 1,108,122 of Apr. 23, 1954, granted to the J. M. Huber Corporation, in the case of $SiO_2/Al_2O_3$ at least equal to 10.

This compound is a very light powder (0.29–0.31 kg./litre) made of very fine particles, of less than one micron diameter. Its physical properties make it suitable as a white pigment and as a reinforcing filler in rubbers.

The analysis of the compound is as follows for 100 parts anhydrous product:

$SiO_2$ —— 74.4
$Al_2O_3$ —— 11.6
$Na_2O$ —— 9.8
$SO_3$ —— 2.9 with small amounts of impurities. The formula may be written as $10.9SiO_2.Al_2O_3.1.39Na_2O$. The hydrated product contains about 10% water. Investigation of the structure by X-rays (powder method) shows that the product is amorphous.

Considering the high fineness of the powder, therefore its high specific area, it would seem that the material might be used as an adsorbent. In fact, nitrogen adsorption at 20° C. is low, as well as oxygen adsorption: less than 1 cc. (NTP) per gram. At low temperatures, appreciable adsorption is found. FIG. 2 of the appended drawing, where P is the pressure in millibars (abcissa) and V the volume of oxygen adsorbed in NTP cc. per gram (ordinate), shows the oxygen adsorption isotherms at —183° C. for the amorphous silicoaluminate used as the starting material in this example (curve II) and for a synthetic crystalline mordenite (curve I). The two curves are well differentiated. Mordenite is characterized by significant adsorption in the low-pressure range, in contrast with the silicoaluminate prepared according to the above-mentioned French patent. At low temperatures, nitrogen adsorption was very slow, and oxygen, which was more rapidly adsorbed, was therefore chosen for this comparative trial.

Synthesis was effected in small stainless-steel autoclaves with 50 cc. effective capacity, heated as described in Example I.

The powdered compound was first dispersed in distilled water (20 g. powder for 100 g. water). The pH of the dispersion was measured.

For trial No. 1, the pH was adjusted to 12.2; for trial No. 2 to 12.5, by adding small amounts of pure NaOH.

After 15 hours hydrothermal treatment at 300° C., a well-settled crystalline product separated, which was filtered and washed until the washings were neutral. The dried product contained 9–10% water.

X-ray investigation demonstrated the presence of essentially pure modenite, as in Table I, for the both trials. The volumes adsorbed at 20° C. under 1,013 millibars were 16.9 cc. (NTP) for trial 1 and 16.6 cc. (NTP) for trial 2.

EXAMPLE VI

Numerous trials were made to specify and define the favorable ranges of temperature and pH for synthesis. The materials subjected to hydrothermal treatment under pressure were such that the $SiO_2/Al_2O_3$ ratios lay between 11 and 12 and the $Na_2O/Al_2O_3$ between 0.5 and 1.6.

The trials were carried out in 50 cc. autoclaves, and the samples were subjected to the usual tests: X-ray powder diagram, nitrogen adsorption at 20° C. under 1,013 millibars. The two methods are known to give good correlation. A well-crystallized mordenite with a sharp X-ray diagram adsorbs 16 to 18 NTP cc./g. nitrogen. The amorphous material, as well as the analcime encountered in some trials, show negligible nitrogen adsorption. The diagrams on FIGS. 2 and 3 of the appended drawing show representative points for the trials carried out in this example.

The nitrogen adsorption values are shown for each point.

(a) Influence of pH

The mixture introduced into the autoclave for synthesis was a dispersion of amorphous silicoaluminate in water (20 g. solids for 100 cc. water). The pH was adjusted to a well-defined value through addition of NaOH; the pH range investigated extended from 10 to 13.5 for a temperature of 300° C. (87 bars).

The points on the diagram (FIG. 3 of the appended drawing), where the pH is carried as the abscissa and the time of hydrothermal treatment under pressure ($t$) as the ordinate, evidence two areas, which have been separated by a dotted line.

Below this curve, results are negative: an amorphous material, denoted by ·, is obtained. Above the curve, results are positive: well-crystallized mordenite is denoted by +. A few intermediate points denote an amorphous phase with a little half-crystallized mordenite: they are shown by+. Analcime is denoted by Δ.

At the upper limit of the diagram, pH=13.3, the material formed contains mordenite and analcime. With such high pH's, mordenite is first formed, then degraded to analcime.

In brief, the rate of formation of mordenite is increased when the pH is raised, with 13.3 as the upper limit.

The time of the hydrothermal treatment is longer than 20 hours for pH=11, and is 7 hours for pH=12.85, at 300° C. under 87 bars. The time is reduced when the temperature is raised and vice versa.

(b) Influence of temperature

The temperature of the hydrothermal treatment was varied at constant pH (12.5). The representative points for these trials define two fairly distinct areas on the diagram of FIG. 4 of the appended drawing, where T (abscissa) is the temperature and $t$ (ordinate) the time of treatment. The border between the two areas is shown as a dotted line. Above this line, the synthesis gives a well-crystallized zeolite; below, an amorphous material.

The existence of an intermediate area, where half-crystallized zeolite would be found, is hard to demonstrate, because the transition from the amorphous to the crystalline phase occurs suddenly, in a fairly short time. With a constant pH and all things being equal, the rate of reaction increases when the temperature rises. At 340° C., which corresponds to a pressure of 150 bars, well-crystallized mordenite was obtained in 4 hours. The time may be further reduced by raising the pH. At pH=12.85, a trial gave mordenite in 2 hours at 340° C.

A temperature of 250° C., corresponding to a pressure of 40 bars, must be reached to achieve synthesis within a time generally favorable to commercial production, i.e. less than 24 hours. On the other hand, although the time taken for total crystallization is several days in the temperature range of 100–200° C., while it is only a few hours at high temperatures close to the critical water temperature, the use of such low temperatures is of great economic interest, since when the temperature of the hydrothermal treatment under autogenous pressure is reduced, the domain of the conventional industrial autoclave operating at not-too-high pressures—less than 50 bars—is reached.

At a temperature of 100° C., adoption of the method becomes really advantageous, since it enables pressurized plant to be dispensed with, and at this temperature probably represents the minimum outlay in equipment, despite a longer period of treatment. This result is particularly important from the industrial point of view, since the crystallization tanks, not having to withstand pressure, can be of very economic design: for example, they may be large well heat-insulated vats, the temperature of which is maintained at about 100° C. by appropriate heating means, such as a hot-water or steam etc. circulation coil, or simple electric resistances immersed in the solution. In particular, apparatus of this sort enables manufacture to be checked at any moment in the reaction, the crystallized mordenite, which will have settled, to be collected by extraction from the vat, and manufacture to be carried out on a continuous basis. Furthermore, the mother liquors can be used again for treating a fresh amount of product and, for this, it will suffice to adjust the pH value to that which most favors crystallization (pH 12 to 13) by the addition of a small quantity of soda.

EXAMPLE VII

The amorphous silicoaluminate subjected to the hydrothermal treatment has the following composition per hundred parts of anhydrous product $SiO_2$ ---------------------------------------- 74.4
$Al_2O_3$ ---------------------------------------- 11.6
$Na_2O$ ---------------------------------------- 9.8
$SO_3$ ---------------------------------------- 2.9 plus small quantities of impurities. The formula may be written: 10.9 $SiO_2$, $Al_2O_3$, 1.39 $Na_2O$. The hydrated product contains 10% of water approximately. X-ray examination of the structure shows that the substance in question is an amorphous product.

The syntheses were carried out in small stainless steel autoclaves of 50 cm.³ useful capacity; heating is carried out in accordance with the technical conditions described in the preceding examples.

At the beginning of the test, amorphous silico-aluminate is dispsersed in distilled water in proportions of 20 g. of powder per 100 g. of water. The pH value of the suspension so prepared is determined.

For the different tests the pH value was adjusted to 12.6 by adding small quantities of pure soda.

The durations of the trials are reckoned from the moment when a constant temperature was brought in.

After a given time, the autoclave is withdrawn from the heating block and rapidly cooled in a current of cold air. Thus, there is practically no additional time to be added to the test time at constant temperature.

The time for obtaining well crystallized mordenite at various test temperatures are shown in the following table.

| Temperature, °C. | Pressure in bars | Duration | Adsorption of nitrogen [1] |
|---|---|---|---|
| 350 | 168 | 2 hours | 18.2 |
| 340 | 150 | 3 hours | 18.5 |
| 320 | 115 | 5 hours | 18.6 |
| 300 | 87 | 9 hours | 18.9 |
| 250 | 40 | 17 hours | 18.0 |
| 200 | 16 | 48 hours | 18.6 |
| 150 | 5 | About 1 week | 17.5 |
| 100 | 1 | 4 weeks | 18.0 |

[1] At 20° C. at 1 bar, in cm.³ N.T.P.

This set of results shows that transformation of the amorphous product occurs at any temperature, but that the kinetics is a function of temperature. At 100° C., the speed of reaction is still sufficiently great to obtain a completely crystalline product in four weeks.

Thus, within a time generally favorable to commercial products, i.e., less than 24 hours, the treatment can be conducted between about 250° C. and 350° C. for 2–17 hours.

EXAMPLE VIII

Direct preparation of agglomerated mordenite

A thick paste is formed by dispersing the amorphous alkaline silico aluminate (having a composition 75% $SiO_2$, 7.8% $Al_2O_3$, 8.5% $Na_2O$ and a small quantity of sodium sulphate) in a 10% aqueous solution of sodium silicate (having a $SiO_2/Na_2O$ molar ratio of 2.8, and containing 30% of silicon).

This paste is extruded into wires having a diameter of about 3 mm., which are stoved at 150° C. and then broken down into small rods. The rods are heat-treated in the furnace at 600° C. for three hours. The granulates are then placed in an autoclave and covered with an alkaline solution having an NaOH concentration such that the pH value is 12.8.

The hydrothermal treatment is carried out at 300° C. under a pressure of 37 bars, for 15 hours. The granulated articles taken from the autoclave have a diameter smaller than they initially had.

After washing and drying at 120° C., followed by dehydration at 400° C., there is obtained a product in the form of dense and very hard granulates which adsorb 17.3 cm.³/grammes of nitrogen at 20° C. and 1013 millibars. In the same conditions the quantity of oxygen adsorbed is 6.4 cm.³/grammes.

X-ray examination gave a result corresponding to that of a substantially pure mordenite.

EXAMPLE IX

Sodium-lithium exchange

The starting material was a well-crystallized mordenite prepared according to Example V. The powdered material, which was pure mordenite without any filler, was placed in a column maintained at 200° C. by a thermostat, through which a 5 N lithium chloride solution was circulated until equilibrium was reached, i.e. until no further change in the sodium content of the effluent was observed. The ion-exchanged mordenite was then washed with pure water until the chlorides were entirely eliminated.

| Compound | Sodium mordenite | Lithium mordenite |
|---|---|---|
| $SiO_2$ | 12.4 | 12.1 |
| $Al_2O_3$ | 1.0 | 1.0 |
| $Na_2O$ | 0.82 | 0.16 |
| $Li_2O$ | 0 | 0.31 |

Nitrogen adsorption by sodium mordenite was 17.1 NTP cc./g. at 20° C. The lithium material adsorbed 8–10% more nitrogen at 20° C.

EXAMPLE X

Sodium calcium exchange

The exchange was achieved by the same procedure as in Example IX, but at 95° C.

1 litre 5 N calcium chloride solution was slowly circulated through 200 g. pure powdered mordenite, obtained by the procedure of Example V, and the traces of chloride were eliminated by washing pure water.

| | Sodium mordenite | Calcium mordenite |
|---|---|---|
| $SiO_2$ | 12.5 | 12.5 |
| $Al_2O_3$ | 1.0 | 1.0 |
| $Na_2O$ | 0.8 | 0.29 |
| $CaO$ | 0 | 0.69 |
| Adsorption at 20° C. under 1 bar NTP cc.: | | |
| Nitrogen | 17.6 | 20.5 |
| Oxygen | 6.5 | 8.7 |
| Adsorption at −183° C. under 0.544 bar, NTP cc.: Oxygen | 107 | 114 |

The calcium material showed higher nitrogen adsorption than the sodium material at 20° C.; at −183° C. also, the result evidenced a higher adsorption capacity or a slightly higher adsorbing area.

EXAMPLE XI

Sodium-magnesium exchange

According to the procedure of Example IX, a 5 N magnesium chloride solution was circulated through 140 g. pure mordenite prepared according to Example V. At the end of the exchange, the material was washed with pure water until the chlorides were entirely eliminated. The degree of exchange was 36%.

| | Sodium mordenite | Magnesium mordenite |
|---|---|---|
| $SiO_2$ | 12.5 | 11.6 |
| $Al_2O_3$ | 1.0 | 1.0 |
| $Na_2$ | 0.8 | 0.47 |
| $MgO$ | 0 | 0.26 |
| Adsorption at 20° C. under 1 bar, NTP cc.: | | |
| Nitrogen | 17.4 | 12 |
| Adsorption at −183° C. under 0.544 bar, NTP cc.: Oxygen | 107 | 105 |

EXAMPLE XII

Sodium-barium exchange

The exchange was achieved through contacting 10 g. sodium mordenite, prepared according to Example V, with 100 cc. saturated barium chloride solution. Two contacts were effected in an autoclave at 150° C. for 24 hours each. The formula of the ion-exchanged material was $0.58Na_2O \cdot 0.69BaO \cdot Al_2O_3 \cdot 11SiO_2$.

EXAMPLE XIII

Sodium-hydrogen exchange (preparation of hydrogen mordenite)

The procedure of Example VII was follower. In a column maintained at 20° C. by a thermostat, a 0.12 N HCl solution was circulated through powdered mordenite obtained according to Example V, until the sodium content of the effluent remained essentially constant. The degree of exchange was 88%.

|  | Sodium mordenite | Hydrogen mordenite |
| --- | --- | --- |
| $SiO_2$ | 11.6 | 11.7 |
| $Al_2O_3$ | 1.0 | 1.0 |
| $Na_2O$ | 0.58 | 0.10 |
| Adsorption at 20° C. under 1 bar NTP cc.: Nitrogen | 17.6 | 8.5 |
| Adsorption at −183° C. under 0,816 bar, NTP cc.: Nitrogen | 108 | 132 |

The affinity for nitrogen at 20° C. was lower in the case of hydrogen mordenite. On the other hand, the rate of adsorption was higher and the amount adsorbed at low temperature was higher.

It will be obvious to those skilled in the art that various changes may be made without departing from the spirit of the invention and therefore the invention is not limited to what is shown in the drawings and described in the specification, but only as indicated in the appended claims.

What is claimed is:

1. A method for the manufacture of crystalline mordenite by hydrothermal treatment, comprising treating under pressure for about 2 to 17 hours, at a temperature between about 250° C. and 350° C., a water suspension of powdery amorphous solid sodium silicoaluminate having a composition such that the molar ratio of silica to aluminum oxide lies between 9 and 13, and the molar ratio of sodium oxide to aluminum oxide lies between 0.5 and 1.6, said amorphous sodium silicoaluminate being a sodium silicoaluminate obtained by reaction between a sodium silicate having a composition such that the molar ratio of silica to sodium oxide lies between 2 and 3.5 in solution and an inorganic aluminium salt solution producing a precipitate, and recovering by filtering said sodium silicoaluminate precipitate, said hydrothermal treatment being carried out at an initial pH between 11 and 13.3.

2. The method according to claim 1 wherein the aluminium salt is selected from the group consisting of aluminium sulphate, aluminium chloride, aluminium nitrate, and an alum.

3. The method according to claim 1 wherein reaction between the sodium silicate solution and the inorganic aluminium salt solution is effected by pouring one solution into the other.

4. The method according to claim 1 wherein the powdery amorphous silicoaluminate has a particle diameter of less than one micron and has an analysis corresponding to the formula $10.9SiO_2.Al_2O_3.1.39Na_2O$.

Figure 4:
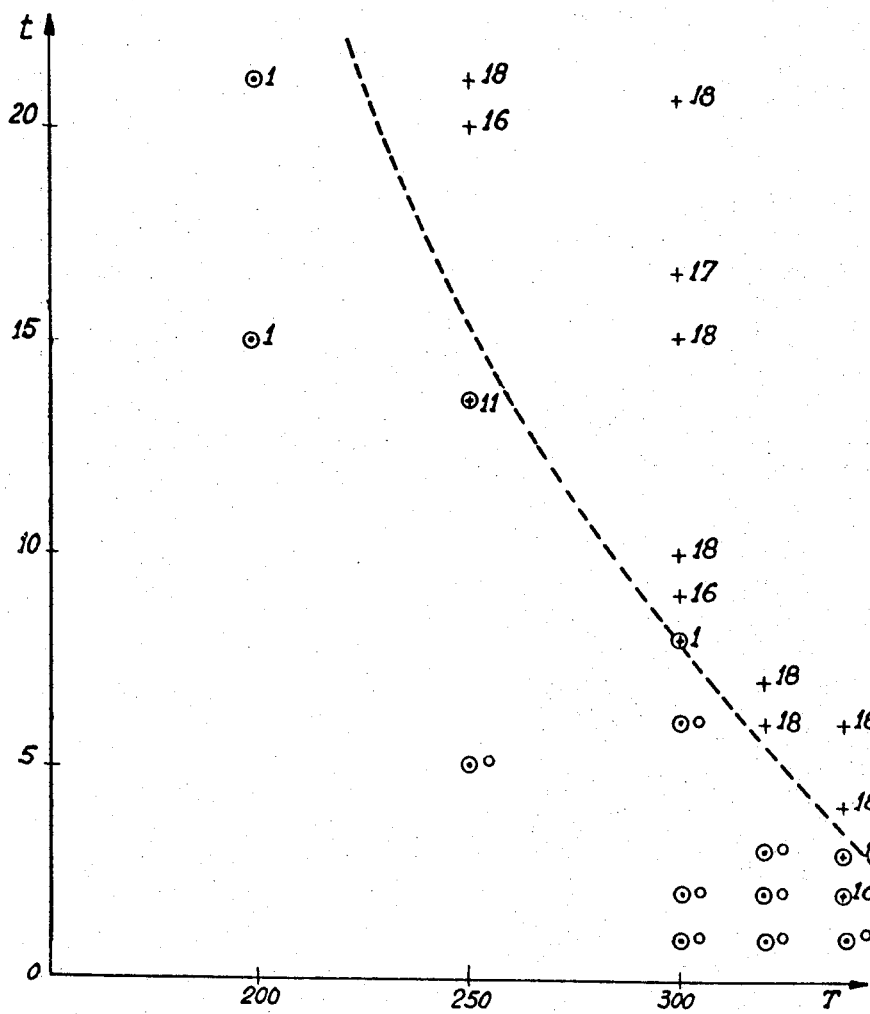

5. A method in accordance with claim 1 wherein the time-temperature relationship of said treatment is shown in FIG. 4 above the dotted line.

6. A method in accordance with claim 1 wherein said molar ratio of silica to aluminum oxide lies between 10 and 12.

7. A method in accordance with claim 1 wherein said pH lies between 11 and 13.

Figure 3:
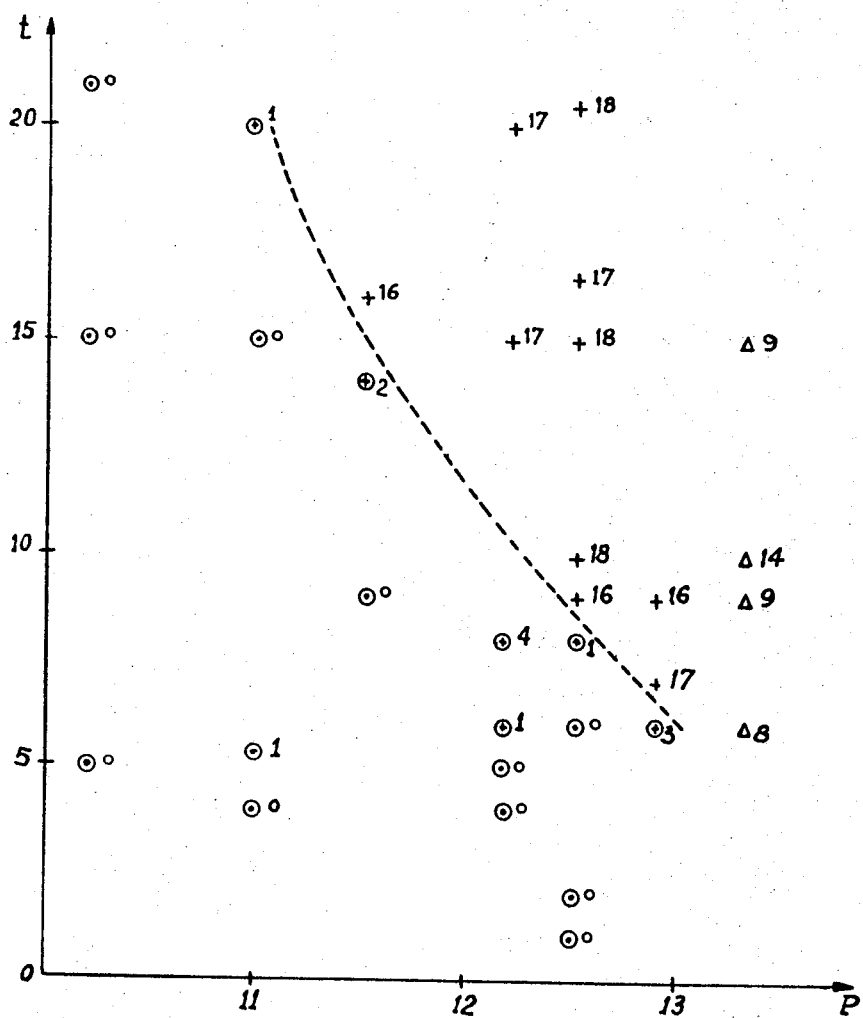

8. A method in accordance with claim 1 wherein the pH-time relationship of said treatment is shown in FIG. 3 above the dotted line.

References Cited

UNITED STATES PATENTS

| 1,515,007 | 11/1924 | Behrman | 23—113 |
| 2,413,134 | 12/1946 | Barrer | 23—113 |
| 2,999,734 | 9/1961 | Weber et al. | 23—113 |
| 3,119,659 | 1/1964 | Taggart et al. | 23—112 |
| 3,334,964 | 8/1967 | Reid | 23—113 |

FOREIGN PATENTS

| 585,169 | 10/1959 | Canada | 23—113 |

OTHER REFERENCES

Barrer: "J. Chem. Soc.," 1948, p. 2158–2163.

EDWARD J. MEROS, Primary Examiner

U.S. Cl. X.R.

23—113

UNITED STATES PATENT OFFICE
CERTIFICATE OF CORRECTION

Patent No. 3,574,539　　　　　　　　Dated　April 13, 1971

Inventor(s)　D. DOMINE et al.

It is certified that error appears in the above-identified patent and that said Letters Patent are hereby corrected as shown below:

Col. 8, line 7, in Table II under column 5, change "2,300" to --2,530--

Col. 10, line 6, in Table IV, delete "$Al_3O_3$" and insert --$Al_2O_3$--

Col. 15, line 8, delete "0,816" and insert --0.816--

Signed and sealed this 7th day of December 1971.

(SEAL)
Attest:

EDWARD M. FLETCHER, JR.　　　　ROBERT GOTTSCHALK
Attesting Officer　　　　　　　Acting Commissioner of Patents